(No Model.)
D. S. & D. YOUNCE.
HEDGE FENCE.
No. 250,032. Patented Nov. 22, 1881.
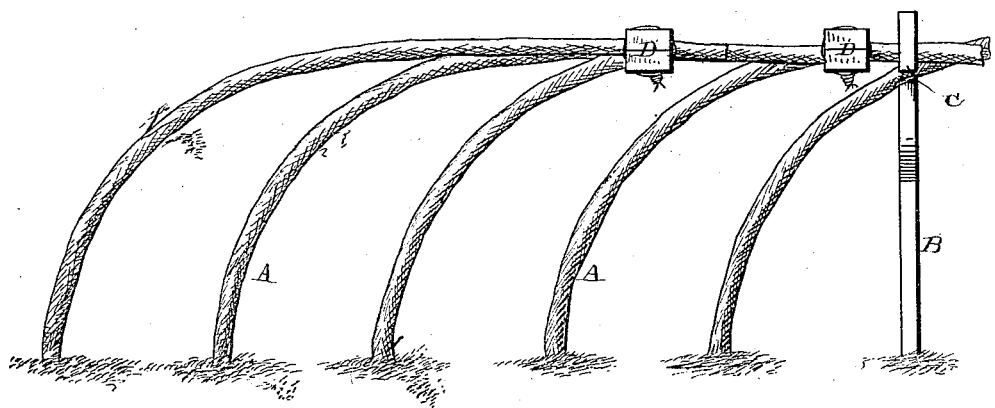
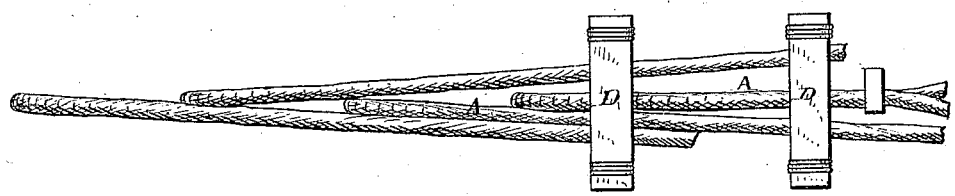
Witnesses:
Inventor:

UNITED STATES PATENT OFFICE.

DAVID S. YOUNCE AND DANIEL YOUNCE, OF WEST MILTON, OHIO.

HEDGE-FENCE.

SPECIFICATION forming part of Letters Patent No. 250,032, dated November 22, 1881.

Application filed August 26, 1881. (No model.)

*To all whom it may concern:*

Be it known that we, DAVID S. YOUNCE and DANL. YOUNCE, of West Milton, in the county of Miami and State of Ohio, have invented certain new and useful Improvements in Hedge-Fences; and we do hereby declare the following to be a full, clear, and exact description of the invention, such as will enable others skilled in the art to which it pertains to make and use it, reference being had to the accompanying drawings, which form part of this specification.

Our invention relates to an improvement in hedge-fences; and it consists in bending the twigs over and securing the first two against a post or stake which is driven into the ground for the purpose, and then fastening the tops of the other twigs in place by bending them over and clamping them together, as will be more fully described hereinafter.

The object of our invention is to secure the plants of a hedge in such a position that they will form a thick and serviceable fence without the necessity of so much cutting and trimming.

Figure 1 is a side elevation of our invention. Fig. 2 is a plan view of the same. Fig. 3 is a side view of the post alone.

A represents the row of plants, and B a post or stake which is driven into the ground at one end of the row, and which post has a suitable notch or shoulder, C, of any kind, formed in one of its edges. The first two or three of the plants are bent over and fastened in this notch or under the shoulder, so that they will be held at the angle at which they have been bent over. The next two or three of the plants are then bent over so that their tops will come upon a level with the second one of the plants which has been made to catch against the post, and then those tops are fastened together by means of a clamp, which consists of two pieces of wood, D, which have their ends secured together by means of wires. The next succeeding series of plants are then bent over and secured to one or more of the plants which have already been bent over and fastened in place, so that they cannot return to a vertical position, and these are clamped in place, as above described, and so on to the end of the row. As the plants grow the branches will grow downward equally upon every side, and, reaching down to the ground, will form a thick, tight hedge, which will form a fence against large and small animals of all kinds.

We are aware that it is not new to bend the upper portions of the plants over and secure them together in this position, and this we disclaim.

Having thus described our invention, we claim—

In a hedge-fence, the combination of the plants A, the post B, having a notch, C, formed in one side, and the clamps D, which hold the plants in an inclined position and secure them together, substantially as shown.

In testimony whereof we affix our signatures in presence of two witnesses.

DAVID S. YOUNCE.
    DANIEL YOUNCE.

Witnesses:
 G. W. NILES,
 L. F. NILES.